United States Patent Office 3,759,716
Patented Sept. 18, 1973

3,759,716
PRODUCTION OF FISH PROTEIN
Marvin Schulman, Monroe, and Esra Pitchon, Flushing, N.Y., and Charles D. Anderson, Lebanon, N.J., assignors to General Foods Corporation, White Plains, N.Y.
No Drawing. Filed Mar. 4, 1971, Ser. No. 121,129
Int. Cl. A23j 1/04
U.S. Cl. 99—18                                     7 Claims

ABSTRACT OF THE DISCLOSURE

The invention entails an improved process for preparing bland fish protein concentrate by boiling whole frozen or fresh fish to separate the flesh from the bone, and removing the oils from the water surface generated during boiling. The slurry is then acidified to suppress protein solubility and the mixture is ground or comminuted so as to substantially retain the bones at original size, whereupon the slurry is screened to remove water and fine solids. The mixture is then extracted with a bland solvent and dried to a bland protein concentrate. Deboning may occur after boiling, after acidification or after drying.

BACKGROUND OF THE INVENTION

Field of the invention

This invention relates to preparing protein concentrates from fish and more particularly to the production of deodorized fish protein concentrate from fish having high oil contents. Typically about 20% of the edible portion of most fish is protein, however, fish has a short shelf life which limits the opportunity of making the protein available for widespread use.

Past efforts to broaden human consumption of protein derived from fish sources have met with success due to conversion of fresh fish to flours which are lacking in the fishy odor and characterized by appreciable shelf life.

Description of the prior art

Development of fresh fish flours characterized by a lack of fishy odors and prolonged shelf life is set forth in U.S. Pat. No. 3,252,962. The invention involves a process for preparing proteinaceous flours from fish under conditions which prevent oxidation of the fat components of the flour and comprises comminuting fish, mixing the fish with water to form a slurry and adding an antioxidant to the slurry. The slurry is subsequently acidified to its mean isoelectric point to precipitate the proteins, and the precipitated proteins are extracted of lipoids by bland solvents prior to drying to obtain a fish protein flour free of odor, aroma and taste.

SUMMARY OF THE INVENTION

A simplified and improved process has been discovered for producing bland fish protein concentrates. Essentially, the process is directed to boiling whole fish, either fresh or frozen, in water to effect separation of the flesh while leaving the bone structure substantially intact and driving the fish oils to the surface, where it can readily be removed or skimmed from the top of the boiled slurry.

Since the process avoids grinding of the fish in the first processing step, the bones as a whole remain intact, and screening of the slurry to remove the bones may be practiced prior to extraction with a solvent. As a result of this step the final fluoride content in the finished fish product is notably and significantly lower.

Removing the surface fish oils evolved during the boiling step has the beneficial effects of materially reducing the frequency or extent of multiple bland solvent extractions because less fish oils are present immediately prior to the extraction step. Moreover, this surface oil-removal-step reduces the potential rancidity and spoilation rate of the product and permits the addition of lesser quantities of antioxidants to the fish-slurry. Boiling the fish will also have the effect of retaining relatively large pieces of flesh, which renders subsequent processing steps such as screening or filtering much easier.

The principal object of the invention is to provide an improved, less expensive and simpler process for producing bland fish protein concentrates.

Another object of the invention is to retain fish bones substantially intact during processing, while maximizing fish oil evolution and removal.

A yet further object of the invention is to lessen the potential for rancidity and spoilation of fish protein, lower the quantities of antioxidants employed in the slurry, and reduce the number of bland solvent extractions practiced on the fish protein.

A still further object of the invention is to substantially lower the fluoride content of fish protein concentrate and retain relatively large chunks of fish flesh to facilitate or render the screening or filtering steps easier.

Other objects and advantages of the invention will become apparent in the description and examples hereinafter appearing.

DETAILED DESCRIPTION OF THE INVENTION

The inventive process of the instant application essentially entails subjecting whole fish, either fresh or frozen to boiling water for a period sufficient to separate or disrupt fish flesh away from the bone. After boiling the mixture is allowed to sit without agitation, during which time fish oils collect upon the surface of the mixture.

Neither the rate or time of boiling nor the period in which the mixture is allowed to sit without agitation are critical; thus pressurized cooking at higher temperatures (to 275° F.) for shorter periods of time is also contemplated. In general, as long as the boiling temperatures approximate about 212° F. or above, such will suffice. It is preferred, however, to boil the fish approximately thirty minutes in an equal weight of water and allow the mixture to sit for about thirty minutes without agitation to permit oil surfacing. When continuous pressure cooking is practiced, gentle agitation may be employed to facilitate oil surfacing. The oil may then be removed by centrifugation and the water recycled for the next batch of fish. After surfacing, the oil removal is effected and the flesh may be screened away from the bone at this juncture if desired.

Next the slurry is acidified to about the mean isoelectric point to suppress protein solubility by reducing the pH to about 4.5 to 5.0, and an antioxidant is added in amounts ranging from about 0.001% to about 0.2 by weight of the slurry. The acidulants are not critical, and those contemplated are hydrochloric acid and sulfuric acid. Particular antioxidants employed are not critical, and those delineated in U.S. Pat. No. 3,252,962 are equally applicable here. Moreover, if desirable, the antioxidant may be incorporated into the bland solvent and applied during the extraction step infra.

If deboning has not been effected at this point, the mixture may be passed through a mill with coarse, perforated plates to grind up chunks of flesh while substantially retaining the bones in their original size. If desired, deboning may be effected at this point. If not, the ground slurry is passed over a 60 mesh U.S. standard sieve screen with the mixture of bones and +60 mesh protein particles being retained on the screen. The +60 mesh weight held on the screen will be about 40% of the weight of the original slurry.

The —60 mesh mixture of water and fine solids is passed through a centrifuge to obtain a cake which represents about 2% of the original slurry weight.

Again, if deboning has not been effected at this point, the +60 mesh bone and protein is slurried with a bland solvent at about 170° F. to remove the remaining portions of lipoid (i.e. fatty and oily) materials. Preferred solvents are those that do not react chemically with any of the components of the fish under the conditions prevailing and which are substantially non-toxic and are not liable to induce toxicity in the product. The preferred specific bland solvents are tertiary butyl alcohol and isopropyl alcohol; however, any of the solvents and solvent admixtures, including azeotropic mixtures used in U.S. Pat. No. 3,252,-962 are operable within the purview of the invention. Moreover, successive extractions with different solvents or solvent admixtures, as set forth in the above referred to patent, is operable herein.

In the extraction step, the mixture of bone and protein may be slurried with solvent in a ratio of about 1 part of solvent to 0.2 to 1 part by weight of the mixture, at ambient temperatures, or at temperatures between 155 to 180° F. in order to denature the protein. The extraction step may employ various extraction techniques such as a Soxhlet type of extraction. The extraction operation may be followed by a filtration or screening to separate the solids from the solvent, the latter containing much of the undesirable flavors and odors along with the oil and water. The slurrying extraction and filtering steps may be repeated a number of times, i.e. 4 to 5; however, removal of much of the oils during the initial boiling stages reduces the number of solvent washings or extractions required.

After extraction, the product is vacuum-dried at temperatures of about 90°–130° F., preferable at about 110° F., under pressure of 5 mm. Hg to 400 mm.; say 25 mm. At this point if deboning has not been practiced earlier, the vacuum dried product is deboned.

Next, more thorough elimination of the fishy odors are effected by humidifying the vacuum dried fish concentrate. Specifically, the fish concentrate or flour is remoistened to between 20%–25% by weight of moisture and again vacuum dried to between 5% to 8% moisture as infra to de-odorize and de-aromatize the fish protein concentrate.

The invention will now be described by reference to specific examples.

EXAMPLE I

Whole frozen red hake is placed in boiling water, using about 1 part by weight of water per weight of fish. The mixture is boiled for thirty minutes, during which time the fish flesh fell away from the bone. The mixture is allowed to sit for thirty minutes without boiling or agitation, during which time a film of fish oil formed on the surface of the mixture.

The oil film is skimmed from the surface and the pH of the resulting slurry is adjusted to 4.5 with hydrochloric acid to suppress protein solubility. The mixture is passed through a Fitzpatrick mill with a coarse perforated plate to enable grinding to break-up chunks of flesh while substantially retaining bones in their original size. The ground slurry is then passed over a #60 mesh U.S. standard sieve screen, with the mixture of bones and +60 mesh protein particles being retained on the screen. The +60 mesh weight retained on the screen constituted about 40% of the original slurry.

The —60 mesh mixture of water and fine solids were passed through a Sharples Super Centrifuge and pressed to obtain a cake representing about 2% of the original slurry weight.

The +60 mesh bone and protein is then slurried with isopropyl alcohol for 20 minutes at about 170° F. using about 2 parts by weight of alcohol per weight of the mixture. About 0.1 of the weight percent of alcohol is butylated hydroxy toluene. The slurry is filtered and the alcohol extraction operation is repeated about three more times. The product is then dried in a vacuum pan dryer equipped with an agitator for 24 hours at 90°–110° F. Next the product is deboned with a 10 mesh Sweco screen. To the substantially dry flour remaining, a quantity of water equalling 25% by weight of the flour is added. The flour is passed through a Fitzpatrick mill to ensure proper wetting and then dried in a rotary double cone vacuum dryer at 90°–110° F. to produce a concentrate of light color and characterized by a bland taste and color.

EXAMPLE II

Same as Example I, except that deboning is performed prior to extraction with alcohol.

EXAMPLE III

Same as Example I, except that deboning is performed immediately after boiling.

EXAMPLE IV

Same as Example I, except that deboning is performed immediately after acidification.

The initial boiling and oil removal steps enabled the total number of bland solvent extractions to be reduced. For example, if the fish is first ground according to prior art techniques set forth in U.S. Pat. 3,252,962, a total of seven bland solvent extractions are required, whereas process of Example I removes a comparable extent of undesirable flavors and odors and thier precursors in as little as four or less extractions.

Additionally, and quite significantly, the fluoride content of the concentrate derived from the process of Example I is less than about 130 parts per million or less, whereas fluoride content derived from techniques set forth in Pat. No. 3,252,962 is in excess of about 160 parts per million.

Although the invention has been described in terms of specific examples, it will be appreciated that various changes and modifications may be made without departing from the spirit and scope of the invention.

We claim:

1. In a process for preparing proteinaceous fish concentrates of low fluoride content wherein a mixture of fish and water is boiled, the oils are removed from the mixture of fish and water, the mixture of fish and water is acidified to about the mean isoelectric point to suppress protein solubility, the water and fine solids are removed from the mixture of fish and water to obtain a coarse solids portion which is treated with a bland solvent to reduce the oil content thereof, dried to a temperature of from about 90° to 132° F., humidified to a moisture content of from 10 to 30%, and redried to less than about 10% moisture, the improvement which comprises:

preparing the mixture of fish and water with whole fish, boiling the fish while whole to separate the flesh from the bone, coarsely comminuting the boiled flesh and bone mixture by breaking chunks of flesh while substantially retaining the bones in their original size, and deboning the coarse mixture after boiling and before treatment with the bland solvent.

2. The process according to claim 1 including the steps of allowing the mixture of fish and water to set after boiling to permit surfacing of fish oils, and removing the fish oils from the surface of the water.

3. The process according to claim 1 wherein the mixture of fish and water is boiled under pressure and the fish oil is removed from the mixture of fish and water by centrifuging the mixture.

4. The process according to claim 1 wherein the deboning operation is conducted after acidification.

5. The process according to claim 1 wherein the fish is whole Red Hake.

6. The process according to claim 1 wherein the treatment of the coarse solids with the bland solvent comprises slurrying the coarse solids in the bland solvent, and then separating the solvent from the coarse solids.

7. The process according to claim 6 wherein the slurry of coarse solids and bland solvent is heated to a temperature of from about 155° to 180° F. to denature the protein prior to separation of the solvent from the coarse solids.

References Cited

UNITED STATES PATENTS

| | | | |
|---|---|---|---|
| 3,259,962 | 5/1966 | Whaley | 99—14 |
| 2,934,433 | 4/1960 | Brocklesby | 99—14 |
| 2,806,790 | 9/1957 | Bedford | 99—18 |

FOREIGN PATENTS

| | | | |
|---|---|---|---|
| 1,093 | 3/1926 | Australia | 99—18 |

ALVIN E. TANENHOLTZ, Primary Examiner

J. M. HUNTER, Assistant Examiner

U.S. Cl. X.R.

260—112